United States Patent
Kim et al.

(10) Patent No.: US 9,070,220 B2
(45) Date of Patent: Jun. 30, 2015

(54) METHOD OF SIMULATING CLOTHING USING LONG RANGE ATTACHMENTS

(71) Applicant: NVIDIA CORPORATION, Santa Clara, CA (US)

(72) Inventors: Tae-Yong Kim, Los Angeles, CA (US); Matthias Muller-Fischer, Uerikon (CH); Nuttapong Chentanez, Bangkok (TH)

(73) Assignee: NVIDIA CORPORATION, Santa Clara, CA (US)

( * ) Notice: Subject to any disclaimer, the term of this patent is extended or adjusted under 35 U.S.C. 154(b) by 76 days.

(21) Appl. No.: 13/719,856

(22) Filed: Dec. 19, 2012

(65) Prior Publication Data

US 2014/0168214 A1    Jun. 19, 2014

(51) Int. Cl.
*G06T 13/20*    (2011.01)

(52) U.S. Cl.
CPC ............. *G06T 13/20* (2013.01); *G06T 2210/16* (2013.01)

(58) Field of Classification Search
CPC .................... G06F 2217/32; G06T 2210/16
USPC .................................. 345/420, 423
See application file for complete search history.

(56) References Cited

U.S. PATENT DOCUMENTS

| | | | |
|---|---|---|---|
| 8,700,364 B2* | 4/2014 | Looney et al. .................... 703/2 |
| 2002/0126132 A1* | 9/2002 | Karatassos et al. ........... 345/586 |
| 2007/0129916 A1* | 6/2007 | Muller et al. ..................... 703/2 |
| 2009/0289940 A1* | 11/2009 | Kimura et al. ................ 345/426 |
| 2012/0086783 A1* | 4/2012 | Sareen ............................ 348/47 |

* cited by examiner

*Primary Examiner* — Maurice L McDowell, Jr.
(74) *Attorney, Agent, or Firm* — Artegis Law Group, LLP (57) ABSTRACT

A method is provided for depicting on a display, an object within a simulated environment having clothing. In this method, the clothing is represented as a series of vertices that include vertices that are attached to the object and vertices that are not attached to the object. The method improves upon position based dynamics algorithm by constraining unattached vertices to be a predefined distance away from attached vertices that are connected thereto to compensate for overstretching in the simulated clothing.

21 Claims, 9 Drawing Sheets

METHOD OF SIMULATING CLOTHING USING LONG RANGE ATTACHMENTS

BACKGROUND OF THE INVENTION

1. Field of the Invention

Embodiments of the present invention relate generally to computer graphics, and, more specifically, to a method of simulating clothing using long range attachments.

2. Description of the Related Art

Real-time computer simulations, which computer games employ, have gained mass popularity in recent times. One goal sought after by the computer game industry is to make games that provide a high level of realism for the game player. Computer game software is often written such that the game produces a lifelike game environment, and may include flowing water, cloth that billows in the wind and other realistic attributes. Creating such a game environment allows a player to become immersed in the game, and may allow the player to feel as if he/she is a character in the game world. A key problem in the game industry is that games often require a great deal of computer resources to produce realistic environments, and developers must balance that requirement with the limited computer resources that are available on a player's computer.

A significant difference between computer games and computer generated image (CGI) feature films such as Jurassic Park or Toy Story is that CGI films are not created in real time. In other words, each image or frame of a CGI film may take hours or days to develop, and may be created by a team of computer graphics engineers. In contrast, each frame of a real-time computer game must occur, by definition, in real time.

A common feature of both motion pictures and computer games is that they are made up of multiple frames that are shown at high speed, often at 23 to 26 frames per second. Operating at this frame rate or higher is required in order for the human eye to interpret a series of still-image frames as actual movement. If the frame rate drops substantially below this rate, a viewer may realize that he/she is viewing a series of still images. While both CGI films and computer games may project frames at high speed, CGI film creators have the luxury of producing a first frame without having to create a second frame almost immediately after the first frame. Computer game makers do not have this luxury, and write the underlying software of a computer game such that the computer game instructs a user's computer to produce a realistic image, and continue producing such images, in a fraction of a second. Furthermore, the computer must produce such images based on the player's interaction with the game. In other words, a computer game is designed to generate the game world in real time, as the player moves about in the game world and makes unique in-game choices. Each time a player interacts with a game, the game produces a unique series of images. This is in stark contrast to a CGI motion picture in which the order of images that make up the motion picture is static, and may not change based on a viewer's input.

Generating a game world in real time requires a large amount of computer resources. If the computer game software is inefficient, the software may cause the computer to produce frames slowly, at less than the desired frame rate. More specifically, the computer game may slow down or even "freeze." As a general matter, a slow or frozen game is undesirable because it may cause a player to become frustrated and may reduce the sense of realism that the game imparts to the player. In addition, a game developer may choose to increase the realism of a game in order to make the game more competitive in the marketplace. However, such an increase in game realism often results in game software that requires a proportional increase in computer resources, which may not be available. Therefore, computer game software requires a delicate balance between creating as realistic a game environment as possible, using as few resources as possible, without allowing the computer game to slow down or freeze.

One aspect of computer games that adds to its realism is simulated cloth. Many games provide simulated cloth in the form of flags, tapestries, or clothing. Generating an image of cloth in the game world, however, may be challenging due to the fact that cloth has a distinct pattern of motion when force is applied to it. Cloth motion patterns are common in games, and may be seen when wind blows against a flag, or when a character walks, and the character's clothing trails in the character's wake. In the real world, these motion patterns are governed by the laws of physics. In the game world, motion patterns are produced by a game engine and are governed by game equations that reflect the movement of cloth in the real world.

A popular approach to generating motion patterns for cloth is the position based dynamics (PBD) algorithm. The PBD algorithm governs the movement of cloth in computer games. However, the PBD algorithm requires a large amount of computer resources in order to simulate realistic cloth movements. More specifically, a game engine using the PBD algorithm may require numerous iterations of the algorithm in order to realistically simulate cloth. As a consequence, a game engine using the PBD algorithm may require a large amount of computer resources in order to execute the desired number of iterations for real-time simulation. As a result, the conventional PBD algorithm is typically not efficient enough for simulating cloth movements in real-time.

SUMMARY OF THE INVENTION

One embodiment of the present invention sets forth a method of depicting on a display, objects within a simulated environment that have clothing. The clothing for an object may be represented as a series of vertices, each having a predefined mass, position and velocity that are updated according to forces applied to the vertices within the simulated environment. The vertices include attached and unattached vertices, the attached vertices modeled as being attached to the object and as having a substantially higher mass than the unattached vertices, which are modeled as not being attached to the object. According to embodiments, a position of one or more unattached vertices that are connected to an attached vertex is constrained to be a predefined distance away from the attached vertex so that unrealistic stretching of the simulated clothing can be prevented.

One advantage of the disclosed embodiments is that clothing is simulated more realistically using less computational resources than the conventional PBD algorithm.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
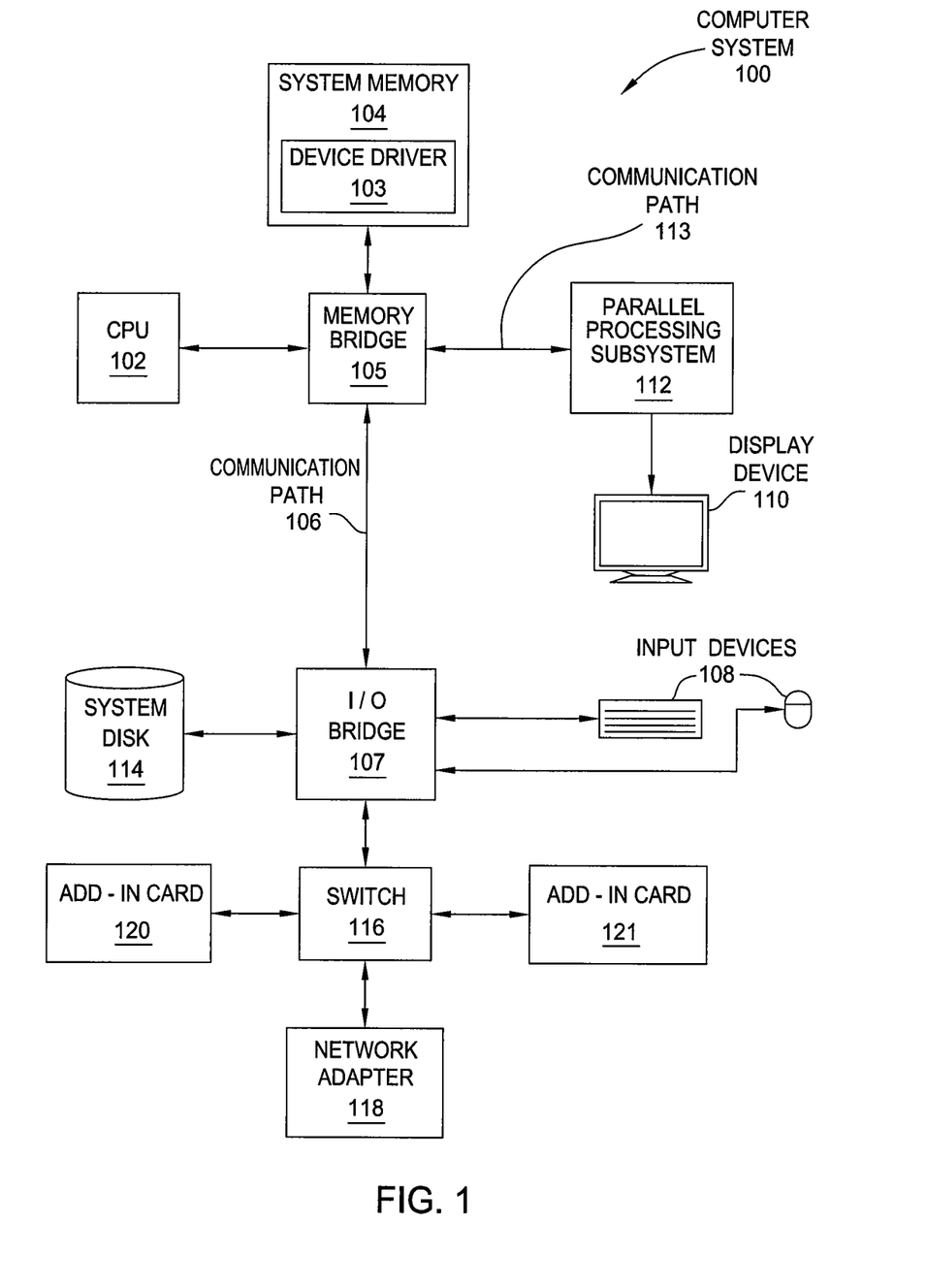
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
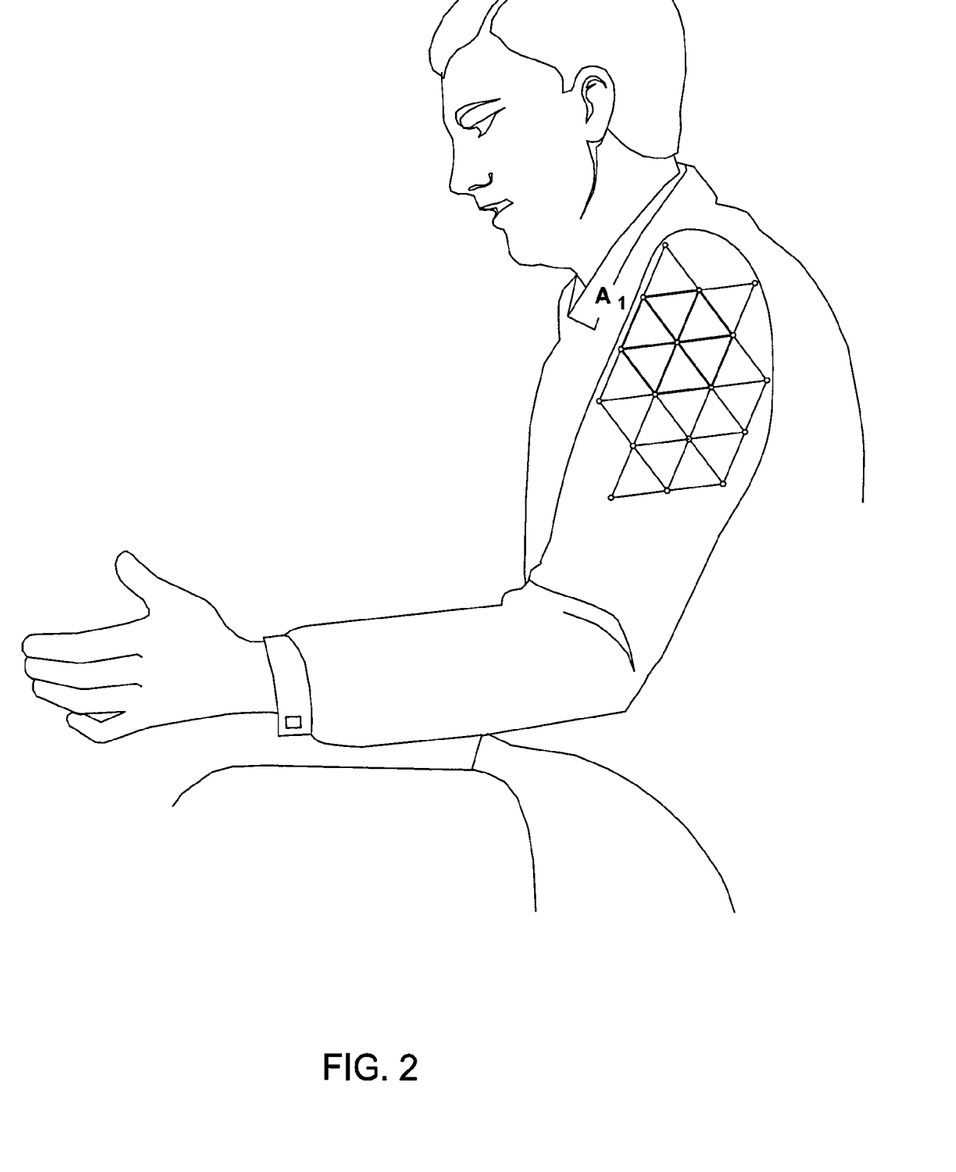
FIG. 2 depicts a mesh used in modeling clothing in a simulated environment, according to an embodiment.

FIG. 2 depicts a mesh used in modeling clothing in a simulated environment, according to an embodiment. The vertices of the mesh are configured in a hexagonal pattern, resulting in numerous triangles. Each vertex is modeled with a mass assigned by a developer of the simulated environment (e.g., a game designer). As a character in the simulated environment moves, the parallel processing subsystem 112 models the flexing or buckling of the clothing in a realistic fashion in the manner that will be described below. In addition to the mass, the developer identifies a series of special vertices known as attachment points. Attachment points are located on strategic areas in the character's clothing. The attachment points are chosen based on areas on a character's body in which clothing is likely to remain stationary while the character is moving. In effect, attachment points serve as anchors for a character's clothing. While the rest of the clothing may flex or buckle, the attachment points do not move. In order to achieve this anchoring effect, the attachment points are assigned a very large or infinite mass. By contrast, the vertices in the rest of the clothing have much smaller, finite mass. FIG. 2 provides a sample point $A_1$, which illustrates the location of one such attachment point on the shoulder of a dress shirt. The shoulder may contain a series of such attachment points located along the entire shoulder. A set of such attachments points that are in close proximity to one another will be referred to herein as an "island." As used herein, a vertex that corresponds to an attachment point is referred to as an attached vertex and a vertex that does not correspond to an attachment point is referred to as an unattached vertex.

Figure 3:
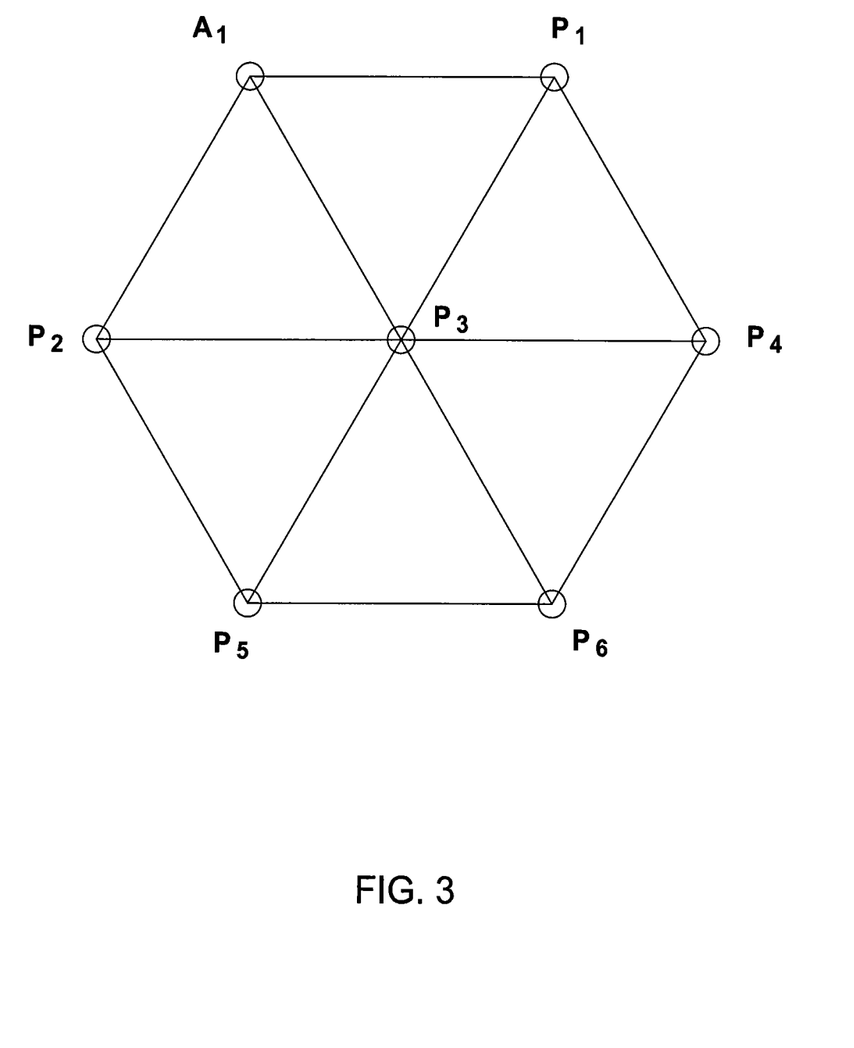
FIG. 3 illustrates the use of a position based dynamics (PBD) algorithm.

FIG. 3 illustrates the application of a position-based dynamics (PBD) algorithm to the mesh shown in FIG. 2, in particular to a segment of the mesh shown in FIG. 2. Vertices are shown in bold, and include attachment point $A_1$ and unattached vertices $P_1$ through $P_6$. The PBD algorithm is an iterative algorithm. During each iteration, the PBD algorithm operates on a first vertex and updates the vertex's position and velocity based on the forces that neighboring vertices are applying to the vertex and external forces applied on the clothing. After operating on a first vertex in this manner, the PBD algorithm operates on a second vertex in the same manner during the next iteration. The PBD algorithm continues iterating in this manner and as a result, generates a realistic motion pattern for modeled cloth in the game world.

One problem with the PBD algorithm is that it requires numerous iterations in order to accurately represent the length of the simulated clothing. For real-time clothing simulation with limited computer resources, the PBD algorithm is executed with a small number of iterations and, as a result, may cause the simulated cloth to appear overstretched. A solution to this problem may be to simply increase the amount of iterations executed by the PBD algorithm, which may in turn compensate for overstretching. However, increasing PBD iterations requires additional computation resources for real-time simulation, which may not be available.

Figure 4:
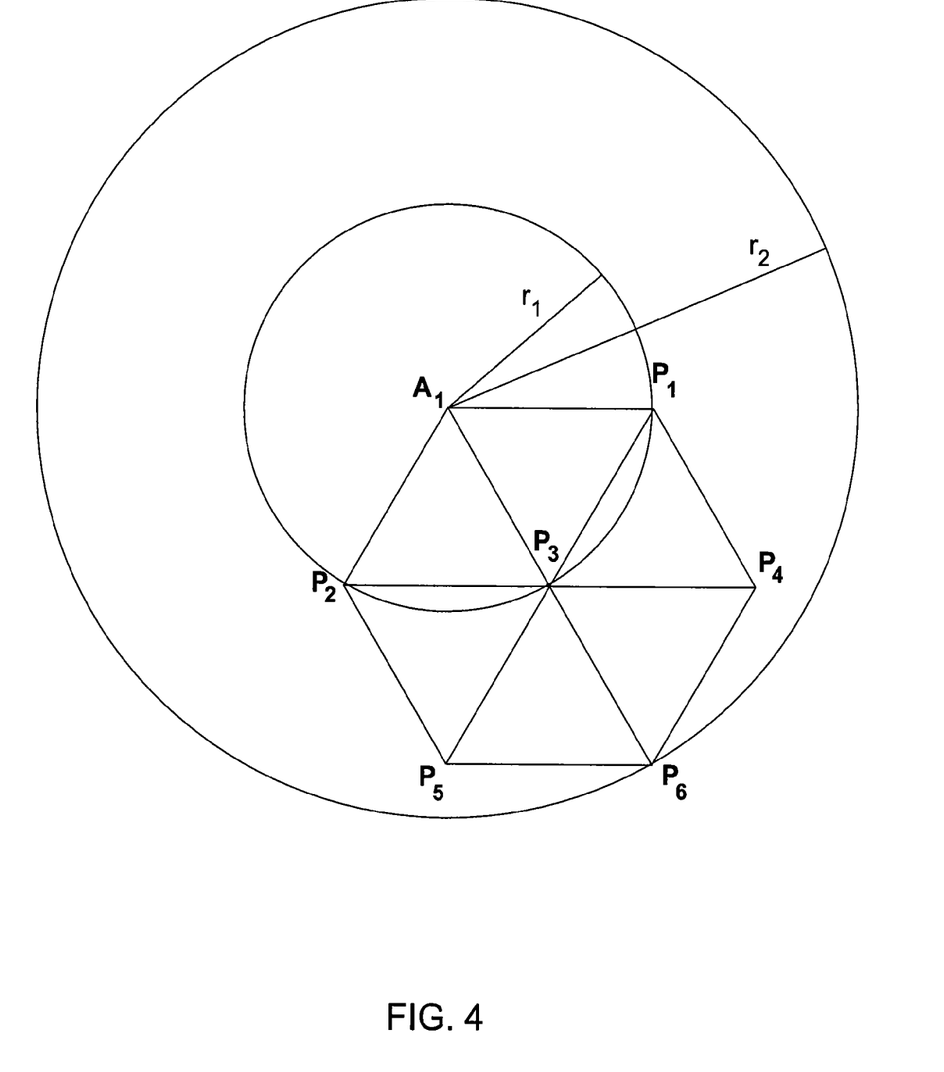
FIG. 4 illustrates the use of a long range attachments (LRA) algorithm, according to one embodiment of the invention.

FIG. 4 illustrates the application of a long range attachments (LRA) algorithm to the mesh shown in FIG. 2, in particular to a segment of the mesh shown in FIG. 2, according to one embodiment of the invention. A method of modeling clothing movement according to an embodiment employs this LRA algorithm. The LRA algorithm operates with constraints, referred to herein as "LRA constraints." LRA constraints are defined for each attachment point (e.g., $A_1$), each such constraint defining a maximum distance between the attachment point and a vertex connected thereto. In FIG. 4, the LRA constraints for $P_3$ and $P_6$ with respect to $A_1$ are shown by radii $r_1$ and $r_2$, respectively. During one iteration, the LRA algorithm applies the LRA constraint to "rein in" each of the vertices with respect to the attachment point so that the vertices do not extend further away from the attachment point beyond the maximum distance, which may happen when the PBD algorithm is executed with a small number of iterations.

According to embodiments, the LRA algorithm is executed in addition to the PBD algorithm. More specifically, in one embodiment, the LRA algorithm is executed once per attachment point, per iteration of the PBD algorithm. When executed in this manner, the LRA algorithm serves to compensate for the overstretching caused by an insufficient number of iterations of the PBD algorithm. While the LRA algorithm adds a certain amount of complexity to each iteration of the PBD algorithm, the LRA algorithm creates a more realistic result with fewer total PBD iterations. In addition, the LRA algorithm creates realistic results using less overall computational resources as compared to increasing the number of iterations in the PBD algorithm to create the same realistic results.

Figure 5:
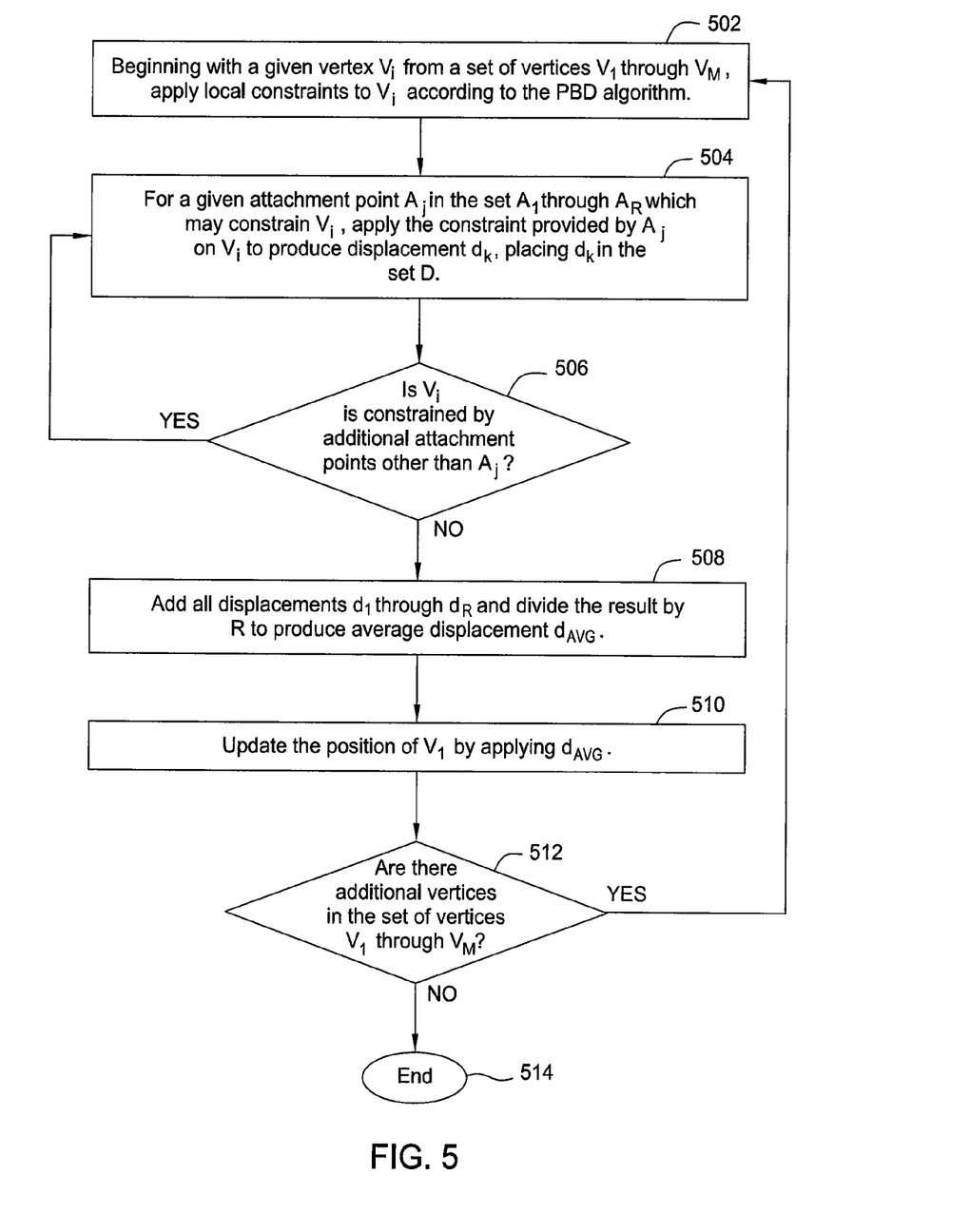
FIG. 5 is a flow diagram for the LRA algorithm, according to one embodiment of the invention.

FIG. 5 is a flow diagram of a method for simulating clothing using the LRA algorithm, according to one embodiment of the invention. Although the method steps are described in conjunction with the system of FIG. 1, persons skilled in the art will understand that any system configured to perform the method steps falls within the scope of the embodiments described herein. The method begins at step 502, where, using an input set of vertices $V_1$ through $V_M$ given by the game designer, the game engine calculates and applies local constraints to $V_i$ according to the PBD algorithm. At step 504, for a given attachment point $A_i$ in the set $A_1$ through $A_N$ which may constrain $V_i$, the game engine applies the constraint provided by $A_j$ on $V_i$ to produce displacement $d_K$, placing $d_K$ in the set D. At step 506, the game engine determines whether $V_i$ is constrained by additional attachment points other than $A_j$ in the set $A_1$ through $A_R$. If the game engine determines that the above step returns true, the game engine repeats the above step for each attachment point $A_2$ through $A_R$ to produce displacements $d_2$ through $d_R$. At step 508, the game engine adds displacements $d_1$ through $d_R$ and divides the result by R to produce average displacement $d_{AVG}$. At step 510, the game engine updates the position of $V_1$ by applying $d_{AVG}$. At step 512, the game engine repeats above steps for additional vertices $V_2$ through $V_M$.

The LRA algorithm can be improved in situations where attachment points may be cumulative, according to an embodiment of the invention. Attachment points become cumulative if several attachment points are located close to each other. If cumulative attachment points are detected, the LRA algorithm may sum the forces exerted by each attachment point and average those forces. The average force, and resulting new velocity and position, are then used to update the velocity and position for that vertex. However, if a large number of cumulative attachment points are detected, the LRA algorithm may be forced to compute new values for a vertex with respect to each attachment point, regardless of the fact that each attachment point may contribute very little to the final vertex values.

For example, a first attachment point may exert a given amount of force on a vertex. A second, nearby attachment point in combination with the first may exert approximately twice as much force on that vertex. The LRA algorithm would then average the two forces, as described in the flow diagram above. The resulting average force would closely resemble the individual force exerted by either attachment point. However, in order to calculate this resulting average, the LRA algorithm may require two iterations in order to calculate and apply two LRA constraints, one for each attachment point. The end result is that the game engine may require twice the amount of time and computer resources in the case of two cumulative attachment points, even though the resulting average produced by the game engine is similar to the individual force produced by either attachment point. This expenditure of time and computer resources increases proportionately with each additional cumulative attachment point.

An example of cumulative attachment points may be found in the shoulder of a shirt sleeve. Such attachment points are cumulative because all the attachment points are in close proximity to one another, and thus are unlikely to contribute significantly to the final unattached vertex values. In an embodiment of the invention, such cumulative attachment points may be pruned, and one attachment point may be used as a representative of the entire group, i.e., island. In general, pruning cumulative attachment points allows the LRA algorithm to retain its efficiency and simultaneously provide realistic movement of clothing, thus keeping the user immersed in the game world.

Figure 6:
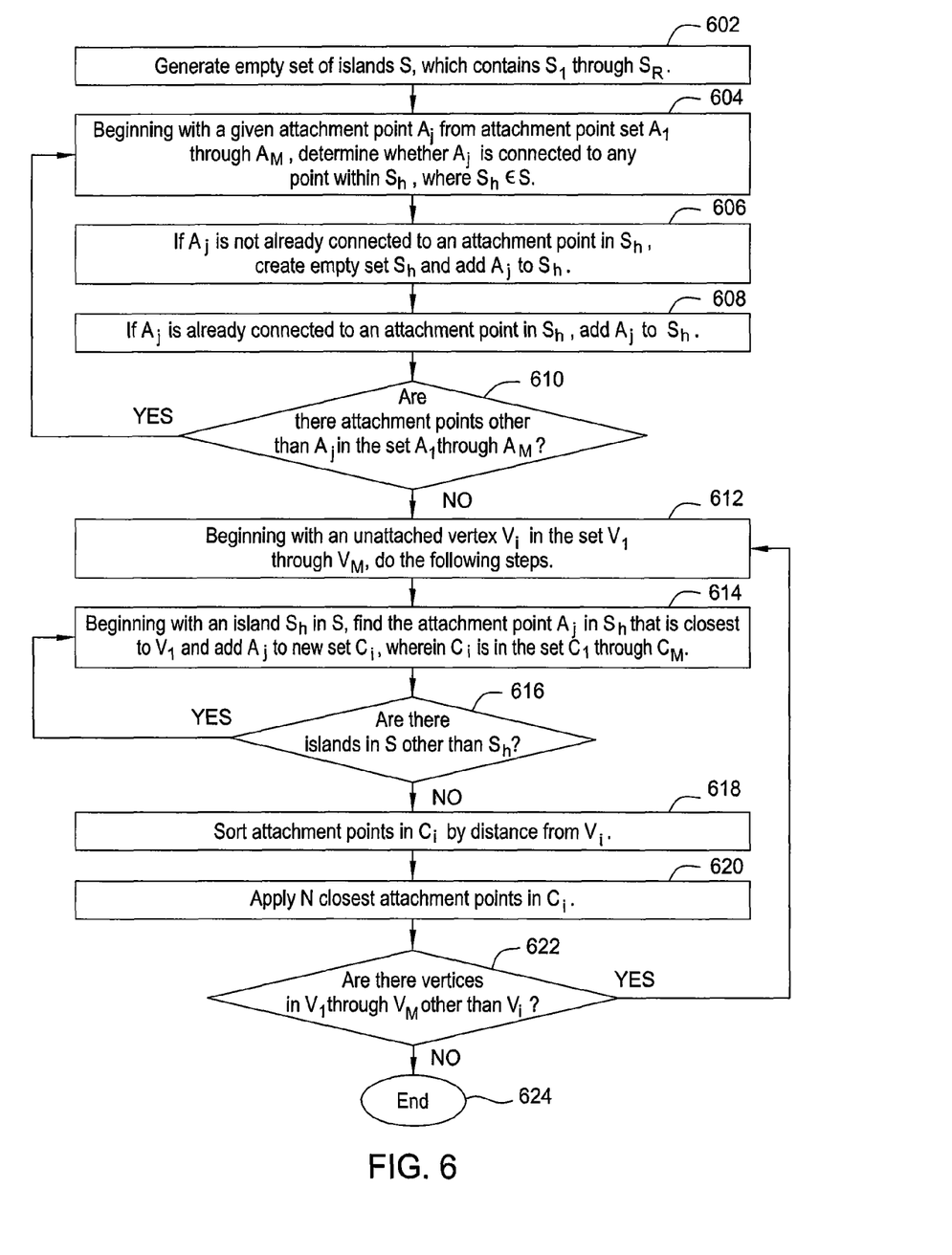
FIG. 6 is a flow diagram for pruning cumulative attachment points, according to one embodiment of the invention.

FIG. 6 is a flow diagram for a method for pruning cumulative attachment points, according to one embodiment of the invention. Although the method steps are described in conjunction with the system of FIG. 1, persons skilled in the art will understand that any system configured to perform the method steps falls within the scope of the embodiments described herein. The method begins at step 602, where the game engine generates an empty set of islands S which contains islands $S_1$ through $S_R$, in which an island is defined as a group of nearby attachment points. At step 604, beginning with a given attachment point $A_j$ from attachment point set $A_j$ through $A_M$, the game engine determines whether $A_i$ is connected to any point within $S_h$, where $S_h$ is an island within the set S. At step 606, the game engine determines whether $A_i$ is already connected to an attachment point in $S_h$. If there is no connection, the game engine creates empty set $S_h$ and adds $A_i$ to $S_h$. At step 608, if the game engine determines that there is a connection, the game engine adds $A_i$ to $S_h$. At step 610, the game engine determines whether there exist attachment points other than $A_i$ in the set $A_1$ through $A_M$. If so, the game engine repeats steps 604 through 610 for all attachment points in $A_1$ through $A_M$. At step 612, the game engine performs the following 5 steps for all unattached vertices $V_1$ through $V_M$, beginning with V. At step 614, for all islands $S_h$ in S, the game engine finds the attachment point A; in $S_h$ that is closest to $V_i$ and adds $A_i$ to new set C. $C_i$ is contained in the set $C_1$ through $C_M$ and is defined to be the set of attachment points which contain one attachment point from each set $S_h$ that is closest to V. At step 616, the game engine determines whether there are islands in S other than $S_h$, and if so, repeats the above step for each island in S. At step 618, the game engine sorts attachment points in $C_i$ by distance from $V_1$. At step 620, the game engine applies N closest attachment points in C. N is a constant that may be chosen beforehand, and typically equals four. At step 622, the game engine determines whether there are additional vertices in the set $V_1$ through $V_M$ other than $V_i$, and repeats the above 5 steps for each vertex $V_1$ through $V_M$.

Figure 7A:
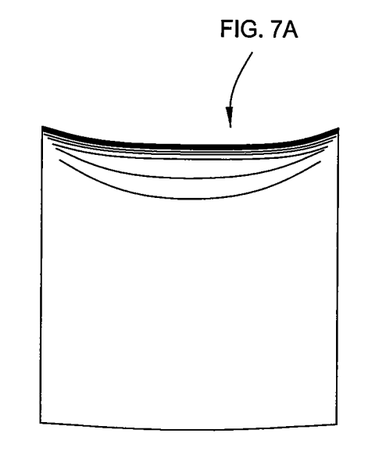
FIG. 7 illustrates the effects of a controlled stretch factor, according to one embodiment of the invention.
Figure 7B:
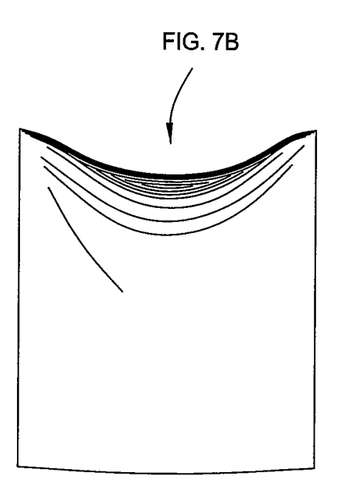
Figure 7C:
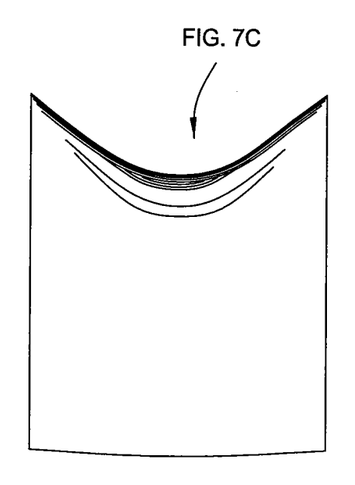

FIG. 7 illustrates the effect of using a controlled stretch factor in simulating clothing, according to one embodiment of the invention. FIGS. 7A, 7B and 7C are depictions of simulated cloth rectangles, each hung by the top left and top right corners. FIG. 7A illustrates an unwanted effect known as an "artifact," which may occur when force is exerted on simulated cloth. More specifically, modeled cloth may undergo an "over-constrained" situation in which there may not be a way to represent the cloth such that all the LRA constraints from all the attachment points are satisfied for each unattached vertex. FIG. 7A shows an over-constrained cloth that appears unrealistically "tight," which is one form of an unwanted artifact. Such artifacts may be detrimental to sense of realism that the game provides to the user, as the simulated cloth may not behave as a user would expect the cloth to in reality.

In order to mitigate an over-constrained situation, the LRA algorithm may support a controlled relaxation of LRA constraints, or in other words, stretching, according to embodiments of the invention. The introduction of a small amount of controlled stretch may serve to solve the over-constrained situation and provide more realistic visual effects, in spite of the fact that real cloth may not stretch in the same manner. More specifically, the LRA algorithm may allow for the LRA constraints to expand slightly in order to reduce the reining-in factor described above. Such controlled stretching creates the realistic effect of drooping, as shown in FIGS. 7B and 7C. By way of example, FIG. 7A represents complete inextensibility, or 0% stretch. In contrast, FIG. 7B represents a 10% increase in LRA constraints in a first embodiment of the invention. Also in contrast, FIG. 7C represents a 20% increase in LRA constraints in a second embodiment of the invention.

Figure 8:
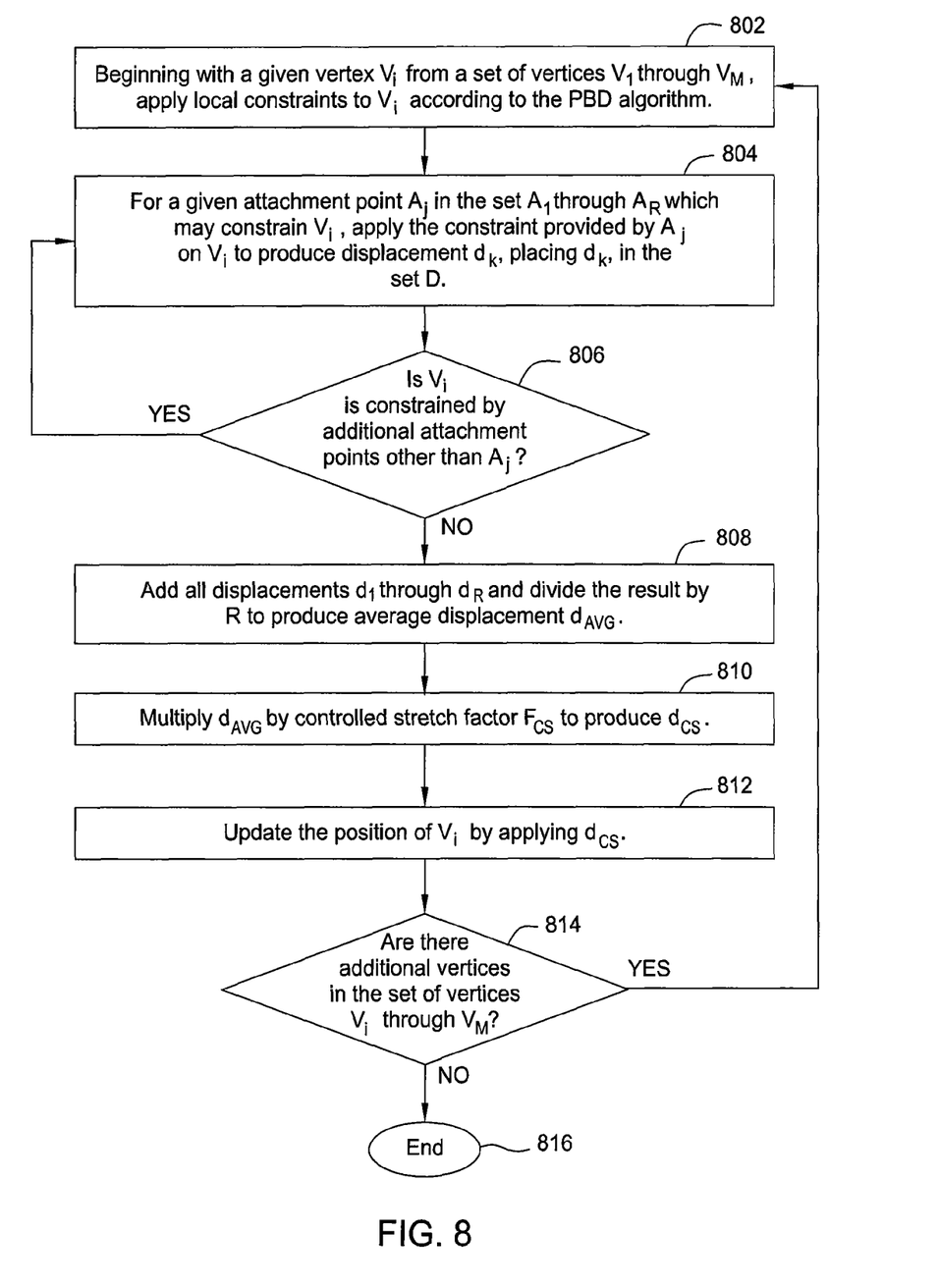
FIG. 8 is a flow diagram for introducing a controlled stretch factor into the LRA algorithm, according to one embodiment of the invention.

FIG. 8 is a flow diagram of a method for simulating clothing using an LRA algorithm modified with a controlled stretch factor, according to one embodiment of the invention. Although the method steps are described in conjunction with the system of FIG. 1, persons skilled in the art will understand that any system configured to perform the method steps falls within the scope of the present invention. The controlled stretch factor $F_{CS}$ allows for a cloth that is modeled by the LRA algorithm to undergo a controlled stretch as described above. Depending on how $F_{CS}$ is varied, the cloth modeled by the LRA algorithm may exhibit more realistic stretching due to character movement or external forces. By way of example, increasing $F_{CS}$ allows for an expansion of the LRA constraints. In turn, such an expansion allows for vertices to travel further away from their respective attachment points than would otherwise be possible without a controlled stretch factor. Steps 802 through 808 are the same as steps 502 through 508 of FIG. 5. At step 810, $d_{AVG}$ is multiplied by a controlled stretch factor $F_{CS}$ to produce $d_{CS}$. Step 812 is the same as step 510, except that the computer updates the position of V; by applying $d_{CS}$, in contrast to step 510, which applies $d_{AVG}$. Step 814 is the same as step 512.

FIG. 9 illustrates the effect of using a geodesic measurement system in contrast to a Euclidean measurement system, according to one embodiment of the invention. A Euclidean distance is the distance between two points that would be produced when measuring with a ruler or other straight edge. In contrast, a geodesic distance is the distance between two points on a curved surface that would be produced when measuring with a flexible instrument such as a tape measure, and accounts for the curvature of the surface.

Game developers may provide a variety of types of cloth, each with unique attributes. One example is a flag. If a game developer provides a flag as a cloth to use in-game, the model for the flag may be relatively simple. The simplicity results in part from the flatness of the flag. The modeling engine may simply calculate the length of the flag by individually calculating the distance between each vertex on the flag.

Game developers may also provide cloth with preformed wrinkles in order to increase the realistic look of the cloth. However, cloth with pre-sculpted folds and curves may provide a challenge to the game engine. Before displaying cloth, the game engine may execute the task of determining the distance between vertices in a given cloth. A Euclidean distance may provide a more accurate determination of the length of a flat piece of cloth such as a flag. In contrast, if a given cloth is curved, perhaps containing wrinkles, the Euclidean distance between the vertices may be shorter than the actual length of the cloth between the vertices due to folds in the cloth. The actual length of the cloth when factoring in the wrinkles is the geodesic distance. The geodesic distance may be longer than the Euclidean distance in the case of folds or wrinkles. If not compensated for, the difference between the distances may result in artifacts as discussed below.

Figure 9A:
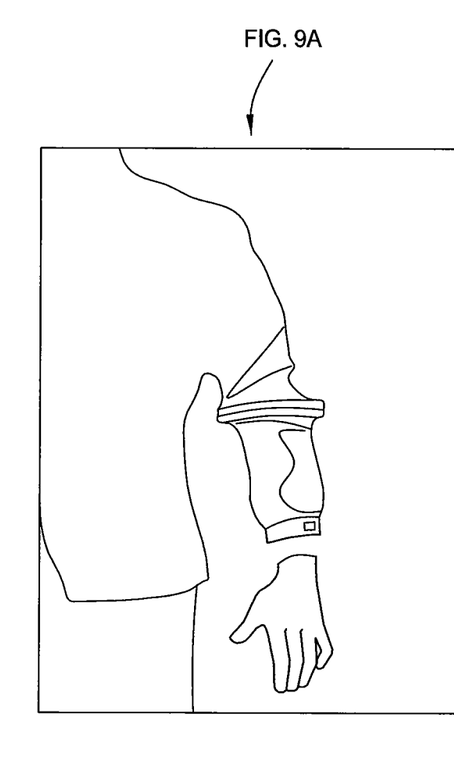
FIG. 9 illustrates the use of a geodesic measurement system in contrast to a Euclidean measurement system, according to one embodiment of the invention.
Figure 9B:
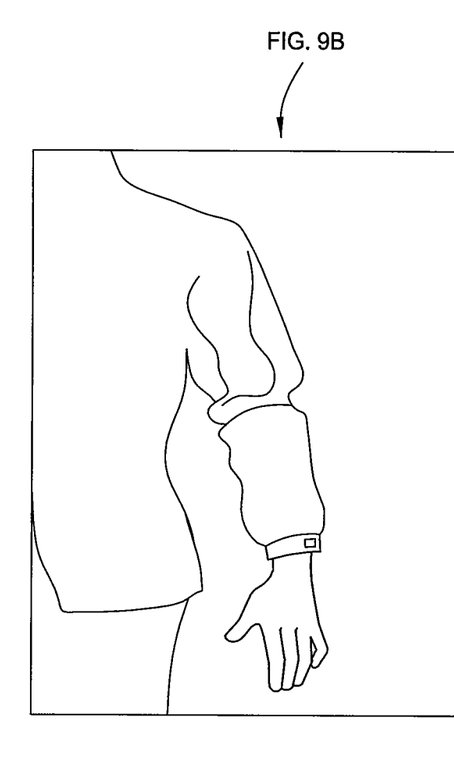

The problem caused by incorrect distance measurements given by Euclidean measurements may be illustrated as follows. For example, when using a Euclidean measurement system, a game engine may incorrectly calculate the distance of a shirt sleeve which includes pre-formed wrinkles. When faced with modeling an outstretched arm, the game engine may not compute the proper length of the shirt sleeve. In other words, the game engine may not accurately extend the shirt sleeve to cover the arm during arm movements, as shown in FIG. 9A. If the shirt sleeve is not extended far enough, the modeled hand at the end of the arm may not contain enough of the modeled forearm to compensate, leaving a gap between the end of the shirt sleeve and the hand, as shown in FIG. 9A. To the user, this outcome appears to look like a disembodied hand floating in space with a small gap between the end of the shirt sleeve and hand in which there should be a forearm. Naturally, a floating hand as in FIG. 9A is far less realistic than the complete arm in FIG. 9B. If such an artifact were noticed by the user, the artifact may be detrimental to the user's sense of immersion in the game world.

The LRA algorithm provides a method for calculating proper distance measurement in spite of wrinkled clothing, according to embodiments of the invention. The LRA algorithm may ignore the Euclidean distance between each vertex (which may result in the artifact as described above) and instead compute the geodesic distance between each point. By computing geodesic distances, pre-formed wrinkles in clothing are less likely to produce artifacts. Geodesic distances describe the true length of the cloth, and the true length can then be used in calculating LRA constraints when executing the LRA algorithm. Thus, the LRA algorithm may operate with increased accuracy and thus allow the game engine to produce more realistic images. Those skilled in the art will appreciate how to calculate geodesic distances in a cloth modeling algorithm.

In a first embodiment of the invention, the LRA algorithm operates to apply an LRA constraint on each vertex in a path and allows simulated tensile pressure waves to propagate immediately from the source attachment point to the vertices in the path. The LRA algorithm operates in this manner in tandem with the PBD algorithm. In a second embodiment, the LRA algorithm can be improved in a situation where attachment points become cumulative. According to this embodiment, the LRA algorithm may sort which attachment points are nearby and group them into islands, and subsequently use only the nearest attachment points from each island, thereby pruning the remaining attachment points. In a third embodiment, a controlled stretch factor may be introduced into the LRA algorithm. According to this embodiment, a controlled stretch factor may mitigate the over-constrained situation in which a vertex may not be able to satisfy all of the LRA constraints imposed on it. In fourth embodiment, a geodesic measurement system may be used to measure a distance between two vertices in a mesh. According to this embodiment, a geodesic measurement system may compensate for the inaccuracies that result from a Euclidean measurement system.

Advantageously, the disclosed techniques allow for increased efficiency in the PBD algorithm, which allows for more efficient use of limited computer resources to create more realistic game environments. Another advantage of the disclosed technique is that the efficiency of the LRA algorithm may be further increased by pruning cumulative attachment points. Thus, the LRA algorithm may iterate fewer times and thus require less computer resources while generating a realistic image of substantially similar quality than the LRA algorithm would if the LRA algorithm iterated through all of the attachment points in a given island. Another advantage of the disclosed technique is that a controlled stretch factor may provide simulated cloth with a more realistic appearance. Thus, artifacts common to simulated cloth wherein the vertices of the cloth are over-constrained may be avoided. Another advantage of the disclosed technique is that the geodesic measurement system may provide simulated cloth with a more realistic appearance. Thus, the artifacts produced by a Euclidean measurement system may be avoided.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method of depicting objects within a simulated environment that have clothing, on a display, said method comprising:
representing, via a processor, a clothing of an object as a series of vertices, each having a predefined mass, position and velocity that are updated according to forces applied to the vertices within the simulated environment,
wherein the vertices include attached and unattached vertices, the attached vertices having a substantially higher mass than unattached vertices, and a position of a first unattached vertex that neighbors an attached vertex is constrained to be a first predefined distance away from the attached vertex.

2. The method of claim 1, wherein a second unattached vertex neighbors the first unattached vertex, and a position of the second unattached vertex is contained to be a second predefined distance away from the attached vertex.

3. The method of claim 1, wherein each attached vertex in the clothing is grouped into one or more sets.

4. The method of claim 3, wherein the grouping is based on a proximity of the attached vertices to one another.

5. The method of claim 4, wherein one attached vertex is selected from each set as an unpruned attached vertex based on the unpruned attached vertex's distance from a nearest unattached vertex.

6. The method of claim 1, wherein the first predefined distance includes the distance between the attached vertex and the first unattached vertex plus an extension amount.

7. The method of claim 6, wherein the extension amount equals an amount between 0% and 10% of the distance between the attached vertex and the first unattached vertex.

8. The method of claim 6, wherein the extension amount equals an amount between 10% and 20% of the distance between the attached vertex and the first unattached vertex.

9. The method of claim 6, wherein the distance between the attached vertex and the first unattached vertex is computed based on a Euclidean distance between the two.

10. The method of claim 6, wherein the distance between the attached vertex and the first unattached vertex is computed based on a geodesic distance between the two.

11. A non-transitory computer readable storage medium comprising instructions that cause a computer system to carry out a method that comprises the steps of:
representing clothing as a series of vertices, each having a predefined mass, position and velocity that are updated according to forces applied to the vertices within the simulated environment,
wherein the vertices include attached and unattached vertices, the attached vertices having a substantially higher mass than unattached vertices, and a position of a first unattached vertex that neighbors an attached vertex is constrained to be a first predefined distance away from the attached vertex.

12. The non-transitory computer readable storage medium of claim 11, wherein a second unattached vertex neighbors the first unattached vertex, and a position of the second unattached vertex is contained to be a second predefined distance away from the attached vertex.

13. The non-transitory computer readable storage medium of claim 11, wherein each attached vertex in the clothing is grouped into one or more sets.

14. The non-transitory computer readable storage medium of claim 13, wherein the grouping is based on a proximity of the attached vertices to one another.

15. The non-transitory computer readable storage medium of claim 14, wherein one attached vertex is selected from each set as an unpruned attached vertex based on the unpruned attached vertex's distance from a nearest unattached vertex.

16. The non-transitory computer readable storage medium of claim 11, wherein the first predefined distance includes the distance between the attached vertex and the first unattached vertex plus an extension amount.

17. The non-transitory computer readable storage medium of claim 16, wherein the extension amount equals an amount between 0% and 10% of the distance between the attached vertex and the first unattached vertex.

18. The non-transitory computer readable storage medium of claim 16, wherein the extension amount equals an amount between 10% and 20% of the distance between the attached vertex and the first unattached vertex.

19. The non-transitory computer readable storage medium of claim 16, wherein the distance between the attached vertex and the first unattached vertex is computed based on a Euclidean distance between the two.

20. The non-transitory computer readable storage medium of claim 16, wherein the distance between the attached vertex and the first unattached vertex is computed based on a geodesic distance between the two.

21. A computer system comprising:
a memory configured to store data related to one or more vertices;
a processor configured to depict objects within a simulated environment with clothing on a display by:
representing the clothing as a series of vertices, each having a predefined mass, position and velocity that are updated according to forces applied to the vertices within the simulated environment,
wherein the vertices include attached and unattached vertices, the attached vertices having a substantially higher mass than unattached vertices, and a position of a first unattached vertex that neighbors an attached vertex is constrained to be a predefined distance away from the attached vertex.

* * * * *